(12) United States Patent
Hirono

(10) Patent No.: US 7,151,548 B1
(45) Date of Patent: Dec. 19, 2006

(54) INFORMATION DISPLAYING SYSTEM, INFORMATION PROVIDING APPARATUS, AND INFORMATION PROVIDING METHOD

(75) Inventor: Chiharu Hirono, Tokyo (JP)

(73) Assignee: Sony Corporation (JP)

( * ) Notice: Subject to any disclaimer, the term of this patent is extended or adjusted under 35 U.S.C. 154(b) by 796 days.

(21) Appl. No.: 09/236,886

(22) Filed: Jan. 26, 1999

(30) Foreign Application Priority Data

Jan. 29, 1998 (JP) .............................. P10-017017

(51) Int. Cl.
G09G 5/00 (2006.01)
G06T 11/20 (2006.01)
G06Q 30/00 (2006.01)

(52) U.S. Cl. ...................... 345/629; 345/440; 345/635; 345/636; 705/14

(58) Field of Classification Search ................. 701/201, 701/209, 211; 345/352, 353; 705/14
See application file for complete search history.

(56) References Cited

U.S. PATENT DOCUMENTS

| | | | | |
|---|---|---|---|---|
| 5,930,474 A | * | 7/1999 | Dunworth et al. | 395/200.47 |
| 5,933,811 A | | 8/1999 | Angles et al. | 705/14 |
| 5,948,040 A | * | 9/1999 | DeLorme et al. | 701/201 |
| 5,966,135 A | | 10/1999 | Roy et al. | |
| 6,067,502 A | * | 5/2000 | Hayashida et al. | 701/209 |
| 6,128,571 A | | 10/2000 | Ito et al. | |
| 6,337,693 B1 | | 1/2002 | Roy et al. | |

\* cited by examiner

Primary Examiner—Kee M. Tung
Assistant Examiner—Chante Harrison
(74) Attorney, Agent, or Firm—Lerner,David,Littenberg,Krumholz & Mentlik, LLP

(57) ABSTRACT

An information displaying system for displaying information corresponding to a geographical location includes a display commanding unit pre-assigned with a unique ID, an information displaying unit for displaying information corresponding to a command received from the display commanding unit, a first data storing unit for storing map drawing element data for drawing a map, a second data storing unit for storing a geographical location corresponding to contents which are displayed corresponding to the command received from the display commanding unit and first attribute information in such a manner that the geographical location and the first attribute information are correlated with the ID, a map drawing commanding units, linked from the display commanding unit, for searching the first data storing unit so as to draw the map corresponding to the location searched from the second data storing unit corresponding to the ID, wherein the map corresponding to a command received from the map drawing commanding unit is displayed by the information displaying means.

1 Claim, 15 Drawing Sheets

Fig. 2

| ADVERTISEMENT NAME | IMAGE FILE NAME | LOCATION DEPENDANT FLAG | MINIMUM LONGITUDE | MINIMUM LATITUDE | MAXIMUM LONGITUDE | MAXIMUM LATITUDE | START DATE/TIME | END DATE/TIME | BUSINESS CATEGORY |
|---|---|---|---|---|---|---|---|---|---|
| WEEKLY TOKYO GUIDE, ISSUE ON NOVEMBER 11, 1997 | tg971122.gif | 1 | 5028600 | 5037400 | 1282367 | 1285469 | 97/11/20 | 97/11/25 | RESTAURANTS, AMUSEMENT PARKS |
| XYZ INSURANCE | XYZ.gif | 0 | | | | | 97/1/1 | 97/12/31 | HOSPITALS, TRAVEL AGENTS, CAR DEALERS |
| | | | | | | | | | |
| | | | | | | | | | |
| | | | | | | | | | |
| | | | | | | | | | |

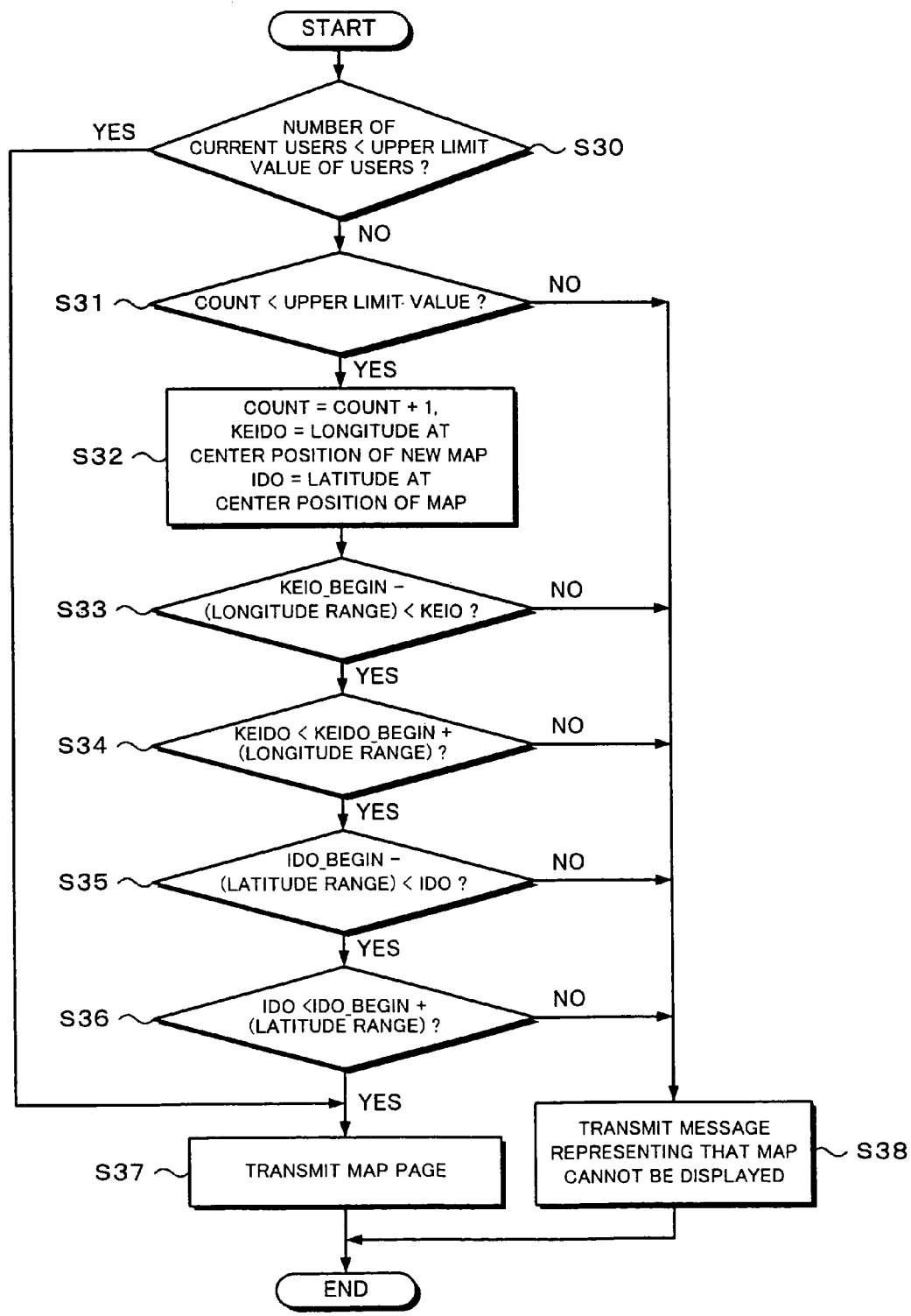

INFORMATION DISPLAYING SYSTEM, INFORMATION PROVIDING APPARATUS, AND INFORMATION PROVIDING METHOD

BACKGROUND OF THE INVENTION

1. Field of the Invention

The present invention relates to an information displaying system, an information providing apparatus, and an information providing method for displaying a map of a neighboring area of a designated point and a message corresponding thereto through a network.

2. Description of the Related Art

Nowadays, web pages have been widely used. The web pages are HTML (Hyper-Text Markup Language) files stored in WWW (World Wide Web) servers and published through Internet. Each web site has at least one web page. The representative page of each web site is referred to as home page. In the following description, a web page is referred to as home page. A network location of a home page is referred to as web site or simply site.

Since a home page is described in HTML that is a relatively simple language and published worldwide, it has been widely used as a personal information transmitting means and a business advertizing means.

To browse an HTML file such as a home page, a WWW browser having a computer application is used. The WWW browser reads a designated file corresponding to for example an input URL (Uniform Resource Locator). When an address on Internet is contained in the file as an URL, a file corresponding to the address is searched and read through Internet. Likewise, as a URL, a local storage medium such as a hard disk of a personal computer on which the WWW browser is running can be designated.

When an HTML file is read by the WWW browser, the WWW browser performs various controls corresponding to the contents thereof. For example, corresponding to the contents of the HTML file, controlling portions such as buttons can be disposed on the WWW browser. Thus, the user can interactively operate the WWW browser with the controlling portions disposed thereon. For example, processes can be allocated to coordinates of image files on the WWW browser. Consequently, when the user designates a particular position with an image on the WWW browser, a process corresponding to the position is performed on the WWW browser.

An HTML file can contain a tag for reading another file. A process for reading another file from a particular HTML file is referred to as link. A link destination may be another URL. Thus, one HTML file can be linked to any file on Internet.

When a file read by the WWW browser is an HTML file, information corresponding to the file is displayed on the WWW browser. When an image file is linked to an HTML file that is read, the URL of the image file is accessed. Thus, the image file is read and displayed on the WWW browser. Likewise, when audio data is linked, the URL thereof is automatically accessed. Thus, data of the audio file is reproduced. Of course, another type HTML file can be linked.

As described above, an HTML file can be automatically linked. Alternatively, an HTML file can be interactively linked by the user. When an HTML file contains a tag for manually linking the HTML file, a link button for controlling the linking of the HTML file is displayed on the WWW browser. When the user operates the link button in a predetermined manner, the HTML file is linked to a predetermined file.

There is a multimedia information searching home page for search information through a network. WWW sites have provided a huge amount of information of various types including technical information, financial information, shopping information, and restaurant information. The WWW sites are operated by various people and organizations (public organizations such as the central government, local governments, large companies, small companies and stores, and people). It is expected that such services using home pages will drastically grow.

The user can easily obtain shopping information, event information, and so forth from such WWW sites. However, even if the user has obtained such information, he or she needs a map to visit the store or event place. Thus, when shopping information and event information are published on home pages, locations of stores and event places should be placed on maps. As described above, since home pages are created with HTML files, when image information of maps showing neighboring areas of the locations of the stores and event places is provided, the maps can be placed at particular positions of particular pages.

However, since roads and geographical shapes are very complicated, it is very difficult for a creator of a home page to create a map showing a neighboring area of a store or an event place and to place it to a particular page. When a creator of a home page draws a map, it is not accurate.

To solve such a problem, it is possible to provide a map information home page for displaying map information corresponding to input location information of latitude and longitude. When such a home page is available, after the user has obtained shopping information, event information, or the like, he or she opens a search page of such a map information home page and inputs location information of the obtained shopping information, event information, or the like. Thus, the user can know the location of the store, event place, or the like on a map. When store names and event place names are correlated with location information, their maps can be displayed without necessity of location information of latitude and longitude.

Many advertisements have been placed on home pages. In this case, image files of advertisements are displayed on pages. On a home page about business related information, an advertisement relating thereto is placed. In other words, the target of the advertisement is a user who is interested therein. In other words, an advertisement placed on a home page depends on the contents thereof.

However, since the contents of home pages are normally fixed, in such a method, the genre of advertisements placed on a particular home page does not vary. Thus, an advertisement with a wider genre cannot be placed on a home page.

In addition, users are not interested in advertisements of specialized fields placed on home pages. Thus, the effects of advertisements are low. For example, when an advertisement of Okinawa (a region in Japan) is placed on a home page about Okinawa, it is expected that users who see the home page are not interested in the advertisement. On the other hand, an article may be placed on a home page that does not relate to Okinawa. When an advertisement about Okinawa is placed on such a home page, it is expected that the effect of the advertisement becomes high. However, it is troublesome to select an advertisement from the related genre whenever an article of a home page is updated.

OBJECTS AND SUMMARY OF THE INVENTION

Therefore, an object of the present invention is to provide an information displaying system that flexibly displays an advertisement and a message corresponding thereto so as to allow a user to be interested therein.

A first aspect of the present invention is an information displaying system for displaying information corresponding to a geographical location, comprising a display commanding means pre-assigned with a unique identification number (ID or ID number), an information displaying means for displaying information corresponding to a command received from the display commanding means, a first data storing means for storing map drawing element data for drawing a map, a second data storing means for storing a geographical location corresponding to contents with are displayed corresponding to the command received from the display commanding means and first attribute information in such a manner that the geographical location and the first attribute information are correlated with the ID, a map drawing commanding means, linked from the display commanding means, for searching the first data storing means so as to draw the map corresponding to the location searched from the second data storing means corresponding to the ID, wherein the map corresponding to a command received from the map drawing commanding means is displayed by the information displaying means.

A second aspect of the present invention is an information providing apparatus for providing information corresponding to a geographical location, comprising a first data storing means for storing map drawing element data for drawing a map, a second data storing means for storing a geographical location corresponding to a particular ID and first attribute information in such a manner that the geographical location and the first attribute information are correlated with the ID, a map drawing commanding means for searching the first data storing means so as to draw the map corresponding to the location searched from the second data storing means corresponding to the ID, wherein when display commanding means assigned the ID is linked to the map drawing commanding means, the map drawing commanding means causes information displaying means to draw and display the map.

A third aspect of the present invention is an information providing method for providing information corresponding to a geographical location, comprising the steps of (a) storing map drawing element data for drawing a map to first data storing means, (b) storing a geographical location corresponding to a particular ID and first attribute information to second data storing means in such a manner that the geographical location and the first attribute information are correlated with the ID, (c) searching the first data storing means so as to draw the map corresponding to the location searched from the second data storing means corresponding to the ID, wherein when display commanding means assigned the ID is linked, the step (c) is performed for information displaying means to draw and display the map.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 2 is a schematic diagram showing an example of the data structure of an advertisement correlation database;

FIGS. 17A and 17B are flow charts showing a process for restricting the display of a map.

DETAILED DESCRIPTION OF THE PREFERRED EMBODIMENTS

Next, an embodiment of the present invention will be described. The information displaying system according to the present invention has a map home page linked to a registered home page. The map home page displays a map. Information such as an advertisement is displayed on the map home page. The information displayed on the map home page depends on the business category of the home page, the location of the store or company of the home page, and the date and time at which the information is searched.

Figure 1:
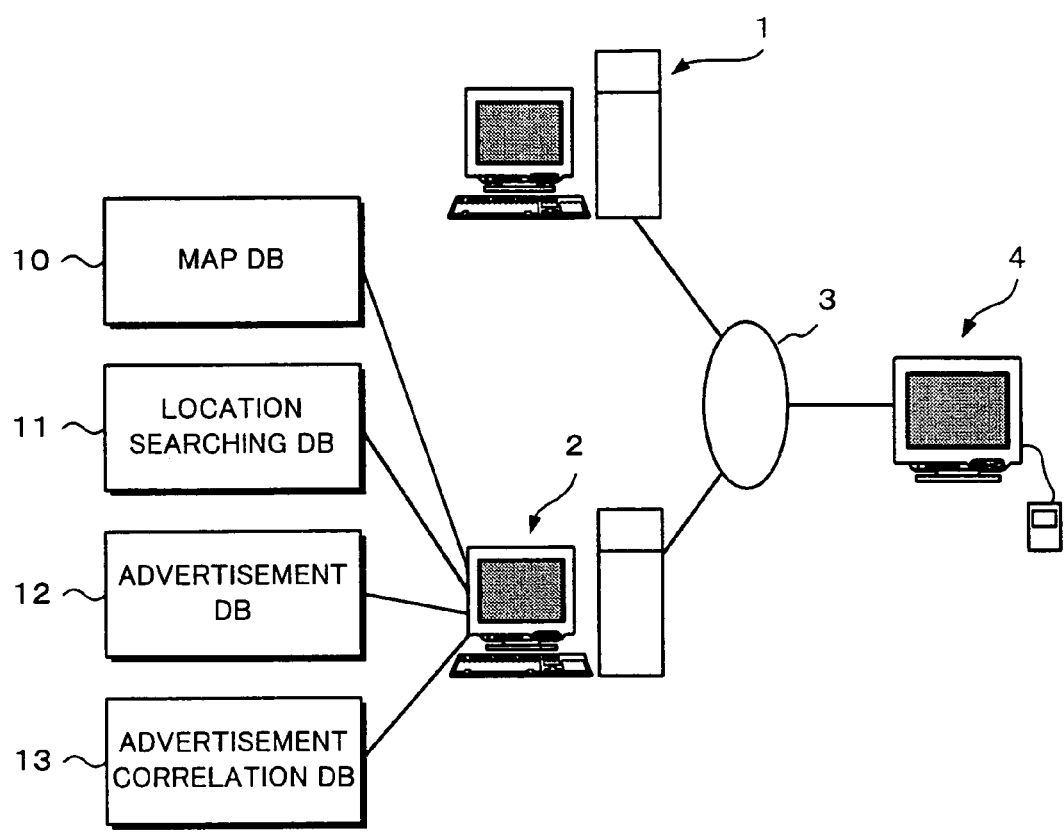
FIG. 1 is a schematic diagram showing an example of the structure of an information displaying system according to an embodiment of the present invention.

FIG. 1 is a schematic diagram showing an example of the structure of the system according to an embodiment of the present invention. A home page server 1 and a map home page server 2 are connected through Internet 3. The home page server 1 is a WWW server. A user terminal 4 is connected to Internet 3 through a public telephone line or the like. Such servers and terminals are identified with unique IP (Internet Protocol) addresses. In addition, they can mutually communicate with each other using IP addresses. Any server and any terminal connected to Internet 3 are treated as the home page server 1 and the user terminal 4, respectively.

The user terminal 4 is for example a personal computer. The user terminal 4 comprises structural portions (such as a CPU, a RAM, and a ROM), a displaying unit (that displays color/monochrome graphic data), and an inputting device (that allows the user to input data as coordinate data on the displaying unit). The user terminal 4 has a WWW browser. The user terminal 4 accesses the home page server 1 through Internet 3. A transmitted HTML file is read by the WWW browser and displayed on the displaying unit. The user terminal 4 may be an information unit other than the personal computer.

The home page server 1 is composed of a plurality of computers that are mutually connected to each other. The home page server 1 stores an HTML file for a home page and image data displayed on pages. In other words, a home page is registered to the home page server 1 and thereby a WWW site is formed. The home page registered to the home page server 1 is assigned a unique ID number by the administrator of the map home page server 2. With the unique ID number, the information displaying system according to the present invention can be used.

When the information displaying system is used, a home page registered to the home page server 1 is linked to a home page registered to the map home page server 2. In addition, the ID number is passed to the map home page server 2. Thereafter, a process of the map home page server 2 is executed.

The map home page server 2 is composed of one computer or a plurality of computers that are connected to each other. The map home page server 2 has a plurality of databases 10, 11, 12, and 13. The database 10 is a map database that stores map information. The database 11 is a location search database that stores location search information. The database 13 is an advertisement correlation database that stores advertisement correlation information.

The map home page server 2 searches the map database 10 and the location search database 11 corresponding to an ID number received from a home page as a link source and creates map image data. The map home page server 2 searches the advertisement database 12 and advertisement correlation database 13 with predetermined search parameters and obtains advertisement image data. The map home page server 2 creates a map home page with the obtained map image data and advertisement image data. The created map home page is displayed on the user terminal 4.

Next, those databases will be described in detail. The map database 10 stores map drawing element data necessary for drawing a map corresponding to latitude and longitude. The map drawing element data is composed of line data, paint data, and character data. The line data is used to draw for example roads and railroad tracks. The paint data is used to draw for example a sea. The character data is used to display for example geographical names. The user inputs search parameters to the map database 10. The search parameters are the latitude and longitude at the center position of an area of a desired map, the size thereof, and the scale thereof. The user designates the size in pixels of the displaying unit of the user terminal 4.

Map data is searched from the map database 10 corresponding to the search parameters. Thus, map drawing element data is obtained. With the obtained map drawing element data, map image data is created. When the user designates coordinates of a desired location on the map, the desired location is highlighted with a marker. The created map image data is displayed on the map home page.

The location search database 11 stores map drawing parameters correlated with an ID number of a home page of the home page server 1. The map drawing parameters are for example the scale of a map, latitude and longitude at the center position of the map, the size of the map, and marker information. In addition, the location search database 11 stores information parameters correlated to the ID number of the home page. The information parameters are for example the name, address, telephone number, business hour, and business category of a company or a store. When the location search database 11 is searched corresponding to an ID number parameters correlated with the ID number are obtained as attribute information of the home page.

Information stored in the location search database 11 is registered on a particular home page by a designated person of a company or a store that uses the information displaying system. It is preferable to select a relevant business category from a pre-designated list.

The advertisement database 12 stores advertisement image data displayed on the map home page. In addition, the advertisement database 12 stores advertisement attribute information. The advertisement attribute information is composed of for example the business category of an advertisement and the genre of commodities thereof. As attribute conditions, it is preferable to add time conditions such as a time zone, days of week, and the period of the advertisement placed on the home page. Advertisement image data searched and obtained from the advertisement database 12 is placed at a peripheral portion of a map on the map home page.

The advertisement correlation database 13 correlates advertisement image data with other parameters in three correlating types. In the first correlation type, the advertisement correlation database 13 correlates a map linked from a home page with the business category of an advertisement. For example, when a home page of a company whose business category is a personal computer is linked to the map home page, it is expected that effective business categories of advertisements are publishers that publish magazines about personal computers and software companies.

In the second correlation type, the advertisement correlation database 13 correlates latitude and longitude information with business categories of advertisements. In the second correlation type, when a map of a resort area is displayed, advertisements of hotels, travel agents, railway companies, and travel guide publishers in the resort area are displayed.

The third correlation type relates to time. In other words, the advertisement correlation database 13 correlates date and time at which the home page of the home page server 1 is linked to the map home page and a map is searched from the map home page server 2 with an advertisement.

In the third correlation type, date and time are correlated with advertisements. Thus, for example, an advertisement of bargain information of a department store or event information can be displayed in a predetermined time period. Alternatively, when time is correlated with advertisements, an advertisement of a soft drink is displayed in the daytime, while an advertisement of an alcoholic drink is displayed in the nighttime. In such a manner, advertisements can be switched corresponding to time zones. In addition, an advertisement of a business company is displayed on weekdays, while an advertisement of an amusement company is displayed on weekend.

FIG. 2 is a table showing an example of the data structure of the advertisement correlation database 13. The first line of the table represents field names. Next, each field of the table will be described. Field "advertisement name" represents a character string of an advertisement. The advertisement name is not displayed on the map home page. In this example, the field "advertisement name" on the second line of the table represents an advertisement of "Weekly Tokyo Guide, Issue on Nov. 22, 1997". The field "advertisement name" on the third line of the table represents an advertisement of "XYZ Insurance Company".

Field "image file name" represents an image file name of an advertisement displayed on the map home page. Alternatively, field "image file name" may represent a URL of an image file. As the searched results of the map home page server 2, image file names are obtained.

Field "location dependency flag" represents a location dependency flag. The location dependency flag represents whether or not the advertisement in field "advertisement name" relates to the location of a map displayed on the map home page. When the value of the location dependency flag is "1", the advertisement relates to the location of the map. When the location dependency flag is "0", the advertisement does not relate to the location of the map. In this example, the advertisement of the magazine on the second line is displayed when a map of a predetermined area (for example, Tokyo) is displayed on the map home page. In contrast, the advertisement of the insurance company on the third line is displayed regardless of the area of the map.

An area is designated corresponding to data in fields "minimum longitude", "minimum latitude", "maximum longitude", and "minimum latitude" as will be described later. The advertisement database 12 may store display area information as advertisement attribute information.

In the fields "minimum longitude", "minimum latitude", "maximum longitude", and "maximum latitude", values that represent the range of the center position of a map in which an advertisement is placed are written. When the center position of a map displayed on the map home page is inside the range defined with the four fields, the advertisement is displayed. Fields "start date/time" and "end date/time" represent a period for which an advertisement is placed.

Field "business category" represents a business category of an advertisement that is displayed on the map home page. In field "business category", a plurality of business categories can be designated.

The advertisement correlation database 13 is created by for example an administrator of the map home page server 2. The contents of the individual fields of the advertisement correlation database 13 depend on contracts made between companies and so forth that want to place advertisements on the map home page and the provider side of the map home page server 2, predictable advertisement effects, and so forth.

In the above-described example, the advertisement correlation database 13 is structured as a table. However, it should be noted that the advertisement correlation database 13 is not limited to such a table. Instead, the advertisement correlation database 13 may be composed of a plurality of tables with a common key of a particular field. The tables may be shared by the advertisement database 12 and the advertisement correlation database 13.

Figure 3:
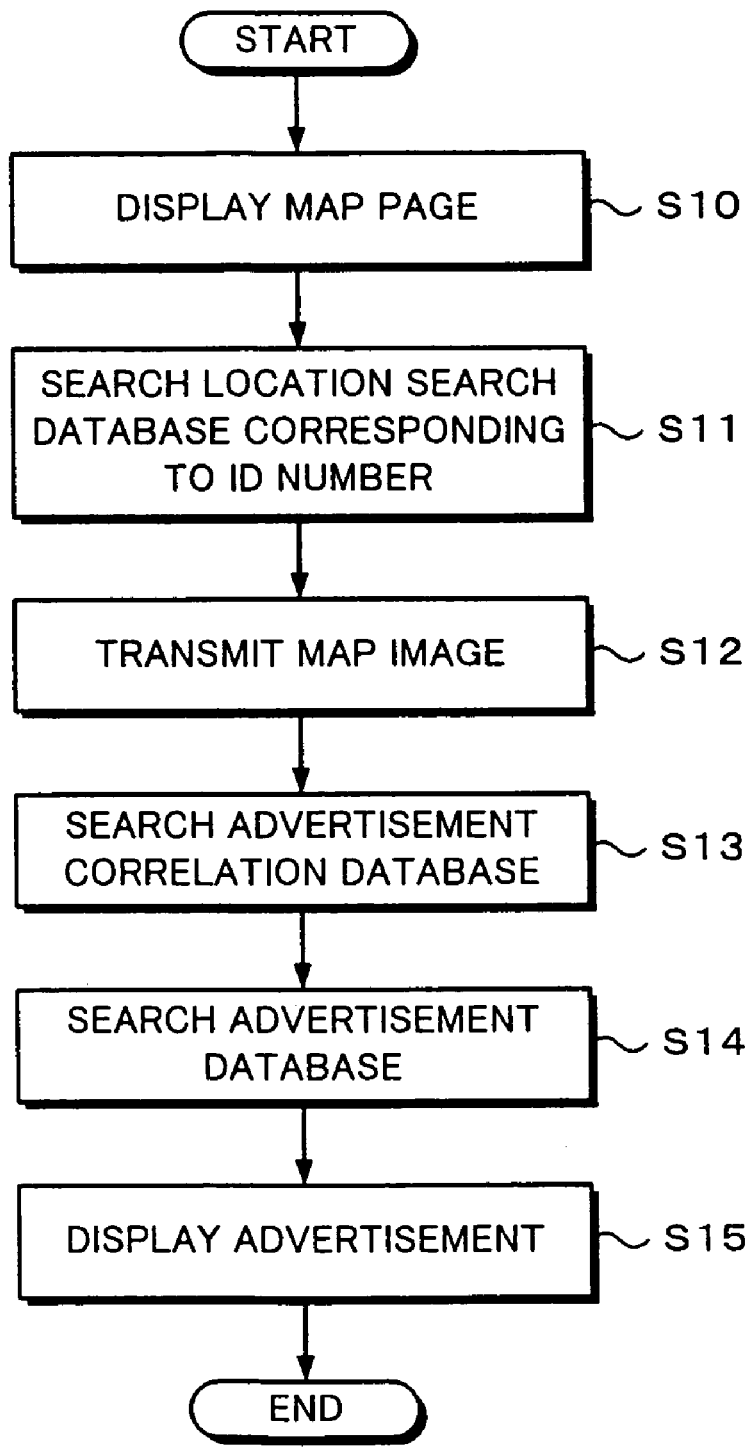
FIG. 3 is a flow chart showing a displaying process of a map home page of the information displaying system.

Next, a process for displaying a map home page in the information displaying system will be described. FIG. 3 is a flow chart showing the process. First of all, the user terminal 4 accesses a home page that guides a company or a store and that has been registered to the home page server 1. The user terminal 4 requests the home page server 1 for a map of the company or the store. The home page is assigned a unique ID number by an administrator of the map home page server 2 beforehand. The request is issued to the map home page server 2. In addition to the request, the ID number is transmitted to the map home page server 2. When the ID number has been transmitted to the map home page server 2, the map home page for a map and an advertisement is displayed on the user terminal 4 (at step S10). The map home page contains various commands that cause the map home page server 2 to display a map and so forth.

The map home page server 2 searches the location search database 11 corresponding to the received ID number (at step S11). The map home page server 2 searches the map database 10 with map drawing parameters obtained as the searched results of the location search database 11. Thus, the map home page server 2 obtains map drawing element data and creates map image data. The created map image data is transmitted to the user terminal 4 (at step S12). The map image of the map home page is displayed on the user terminal 4.

At step S13, the map home page server 2 searches a relevant business category from the advertisement correlation database 13 corresponding to the obtained business category information. At step S14, the map home page server 2 searches an advertisement of the searched business category from the advertisement database 12. The obtained advertisement image data as the searched results is transmitted to the user terminal 4. The advertisement image data of the map home page is displayed on the user terminal 4 (at step S15).

Next, the process for displaying the map home page will be described in detail. First of all, the user operates the user terminal 4 so as to access the home page server 1 for a home page of "ABC Store". The home page is assigned an ID number for the map home page of the map home page server 2 beforehand.

Figure 4:
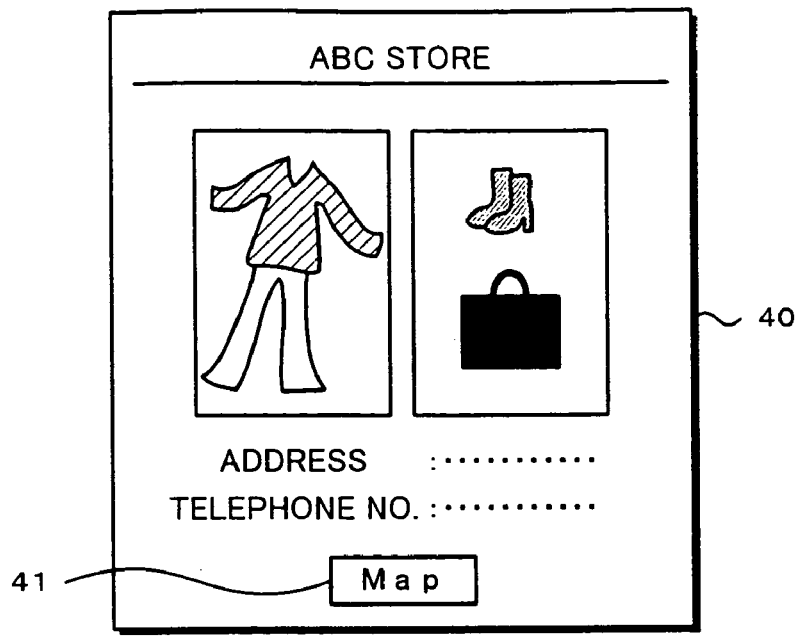
FIG. 4 is a schematic diagram showing an example of a home page for guiding a company or a store.

An HTML file having a command for displaying a relevant home page is transmitted from the home page server 1 to the user terminal 4 through Internet 3. For example, the WWW browser installed in the user terminal 4 reads the HTML file. As shown in FIG. 4, the home page of the "ABC Store" 40 is displayed. In this example, as a guide of the "ABC Store", sales information, the address of the store, and the telephone number of the store are displayed on the home page 40. In addition, a link button 41 for displaying the map of the "ABC Store" on the map home page is placed on the home page 40.

The link button 41 causes a particular request to be issued to the WWW server corresponding to a special expression referred to as HTML anchor. When the link button 41 is pressed, a particular expression (an assigned ID number) is passed to a link destination (namely, the home page 40). For example, the link button 41 in the HTML file is expressed as follows.

<A href="http://www.mapcenter.co.jp/cgi-bin/showMap?ID=12345"><IMG src="map.gif"></A>

In this example, the URL of the map home page server 2 is "http://www.mapcenter.co.jp". In addition, an application "showMap" using CGI (Common Gateway Interface) starts. Moreover, an ID number "12345" as an argument is passed to the application "showMap". In other words, the ID number "12345" is assigned to the home page 40 beforehand. The term "map.gif" is an image file name for displaying the link button 41.

When the user clicks the link button 41 on the user terminal 4, the map home page server 2 is searched corresponding to the URL contained in the HTML file through Internet. After the map home page server 2 has been searched, the application "showMap" is stored on the map home page server 2. The home page 40 (home page server 1) passes the ID number to the application "showMap".

The application "showMap" creates an HTML file which contains a command for displaying a map home page corresponding to a passed ID number. The created HTML file is transmitted to the user terminal 4.

When the application "showMap" creates an HTML file, the application "showMap" searches the location search database 11 corresponding to the ID number and obtains shop information parameters. The shop information parameters are contained in the HTML file so that a predetermined layout is displayed on the map home page.

The HTML file contains layout data such as map image data, various types of character data, and advertisement image data. In addition, the HTML file contains map image data creating conditions and advertisement searching conditions. When the WWW browser of the user terminal 4 reads the HTML file, the WWW browser requests the map home page server 2 for image data corresponding to the contents of the HTML file. The WWW browser directly displays the character data.

Figure 5:
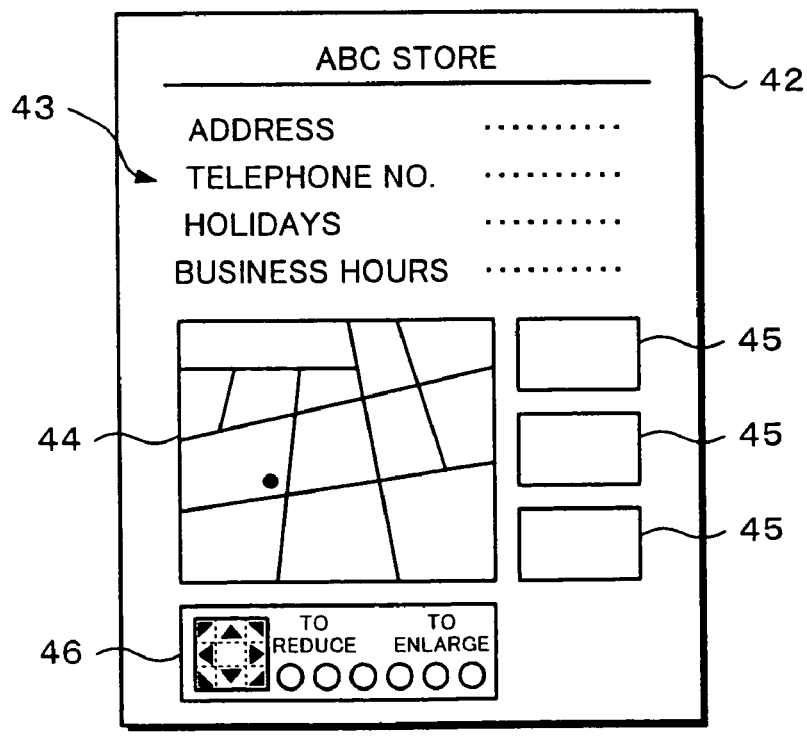
FIG. 5 is a schematic diagram showing an example of a map home page.

FIG. 5 is a schematic diagram showing an example of a map home page displayed on the user terminal 4. In FIG. 5, store information 43 of "ABC Store" is displayed as a character string corresponding to store information parameters contained in an HTML file on the map home page 42. At this point, a map image 44 and advertisement images 45 are not displayed. A controller 46 has a group of buttons as enlargement/reduction buttons and map center position moving buttons.

The map home page server 2 executes a program for drawing a map corresponding to a request from the user terminal 4. The program searches the location search database 11 corresponding to the passed ID number and obtains map display parameters as the searched results. The program searches the map database 10 corresponding to the map scale, the latitude and longitude at the center position of the map as the obtained map display parameters. The program draws a map with map drawing element data obtained as the searched results, highlights the position of the store (or company) guided by the home page 40 with a predetermined marker, and thereby creates map image data. The created map image data is transmitted to the user terminal 4. The user terminal 4 displays the map image data as the map image 44. In FIG. 5, the marker that highlights the store is represented with a black dot.

On the other hand, the map home page server 2 executes a program for searching the advertisement correlation database 13 corresponding to an advertisement image data request received from the user terminal 4. As described above, since the application "showMap" has searched the store information parameters from the location search database 11, the program searches the advertisement correlation database 13 corresponding to the business category as the store information parameters.

As described above, in the advertisement correlation database 13, advertisement images are correlated with at least one business category by an administrator or the like of the map home page server 2. In the example shown in FIG. 4, it is assumed that the business category of "ABC Store" has been categorized as "Apparel Retailers". As expected business categories of effective advertisements to general users who are interested in apparels are for example directed to apparel makers and publishers of apparel magazines. Although the business categories of salons and cosmetics makers do not directly relate to apparels, advertisements of these business categories will be effective.

In the advertisement correlation database 13, at least one business category that is expected to be effective has been registered to field "business category". Thus, when the advertisement correlation database 13 is searched with a particular key (in this example, "Apparel Retailers"), at least one business category that is supposed to be correlated with "Apparel Retailers" is searched.

The searching program also searches the advertisement database corresponding to the searched business category and obtains advertisement image data corresponding to the searched business category. The searched advertisement image data is transmitted to the user terminal 4. The searched advertisement image data is displayed as advertisement images 45 of the map home page 42 on the user terminal 4.

The search conditions of the searching program are not limited to business categories. Instead, as described above, in the advertisement correlation database 13, advertisements are correlated with latitude and longitude and with time conditions. As search conditions, such items can be added. Thus, for example, when the business category of the home page 40 is a publisher for an apparel magazine, an advertisement of a magazine can be displayed before three days of the release of the magazine and until one week after the release of the magazine. In addition, only an advertisement of an salon located within 1 km of the "ABC Store" can be searched corresponding to the latitude and longitude information.

Next, a method for adding and changing information of the location search database 11 will be described. Information stored in the location search database 11 is added and changed on a particular home page (this home page is referred to as registration home page) of the map home page server 2. Information is registered on the user terminal 4. The user terminal 4 accesses the registration home page and the WWW browser of the user terminal 4 displays the registration home page.

Figure 6:
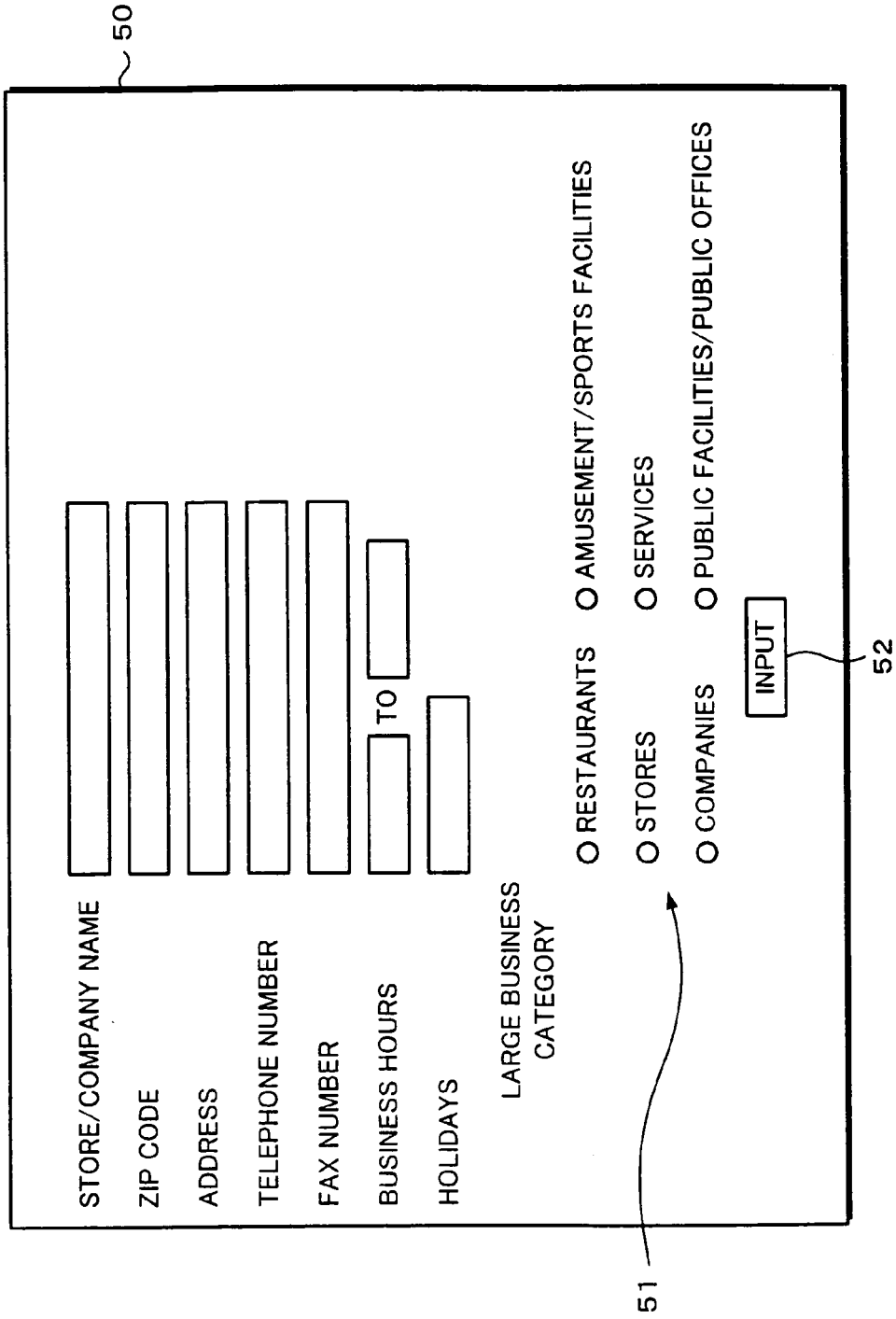
FIG. 6 is a schematic diagram showing an example of a registration page for adding and changing information for a location search database.

FIG. 6 is a schematic diagram showing an example of a registration page 50 of the registration home page. The registration page 50 has input fields for information other than a map. Text data is input to the input fields. On the other hand, a business field is selected from a group of pre-designated alternatives. An inputting portion 51 has large business category names and selection buttons corresponding thereto. The user selects a proper business category with the relevant selection button in the inputting portion 51. After the user has input information into the input fields and has selected the business category, he or she clicks an input button 52. Thus, the registering operation on the registration page 50 is completed. The registered information is stored in the location search database 11.

When information stored in the location search database 11 is changed, the information may be displayed in the input fields and the inputting portion 51 on the registration page 50. When the registering user inputs only desired information and clicks the input button 52, the input information is stored in the location search database 11.

Figure 7:
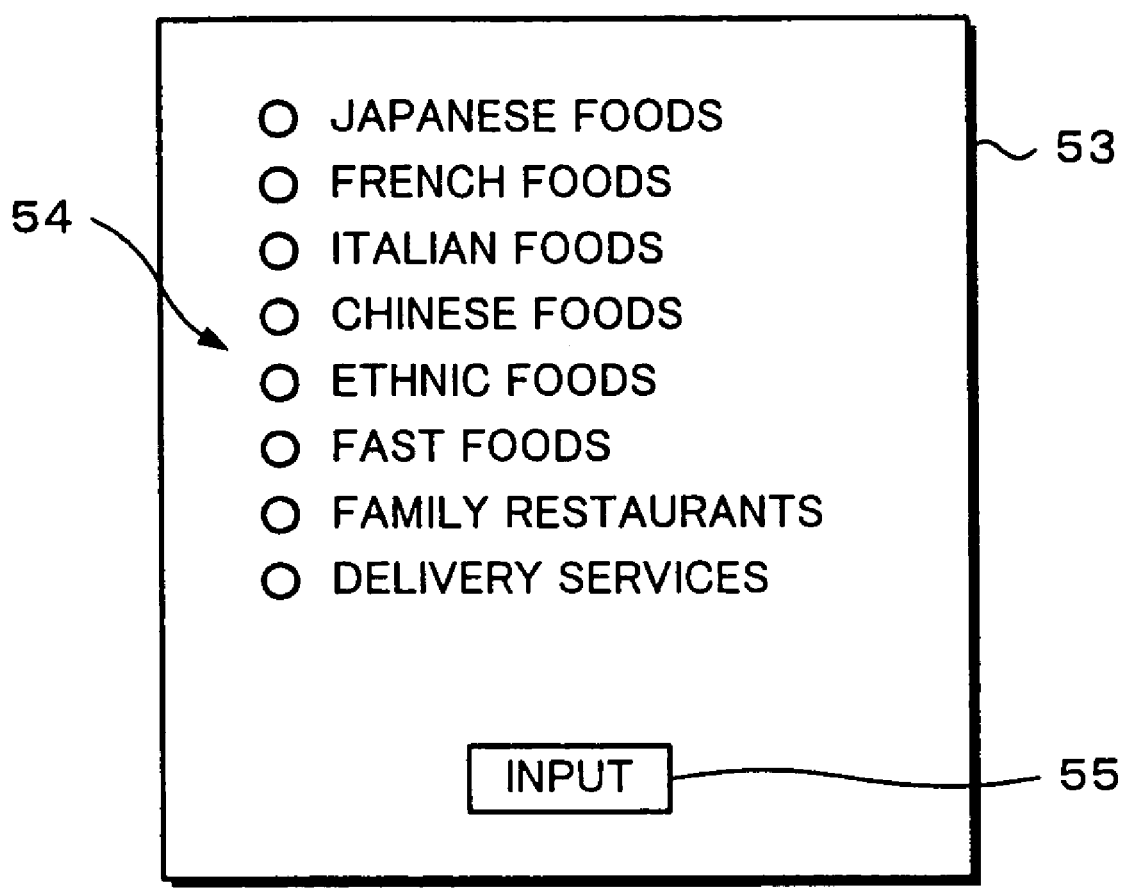
FIG. 7 is a schematic diagram showing an example of a business category input page.

After the input button 52 has been pressed and desired information has been registered on the registration page 50, a business category input page 53 shown in FIG. 7 is displayed. On the business category input page 53, more specific business categories are displayed. Referring to FIG.

7, an inputting portion 54 has small business category names and selection buttons corresponding thereto. The small business category input page 53 is adaptively structured corresponding to the large business category selected on the registration page 50.

FIG. 7 shows an example in the case that the large business category "restaurants" has been selected in the inputting portion 51. The inputting portion 54 has small business category names and selection buttons corresponding thereto. When the user clicks an input button 55, the small business category that has been selected in the inputting portion 54 is stored in the location search database 11.

Figure 8:
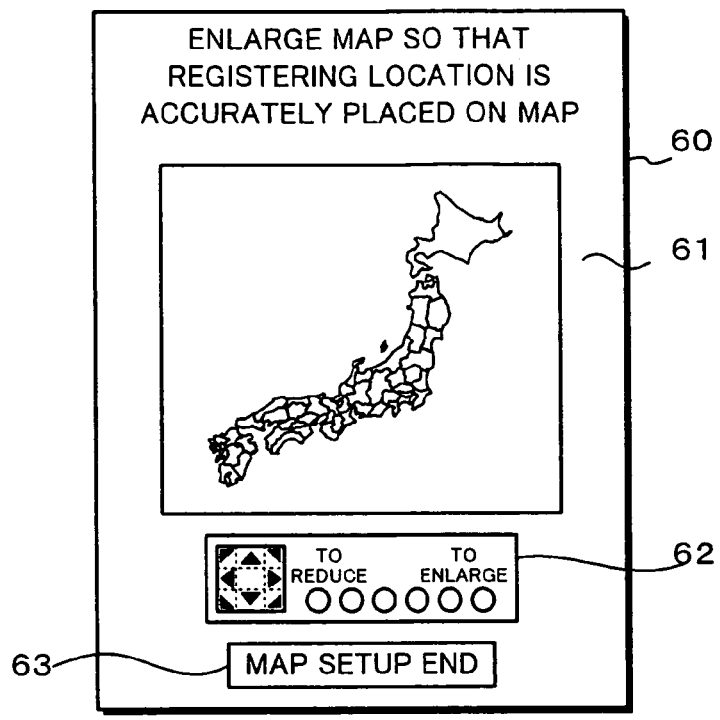
FIG. 8 is a schematic diagram showing an example of a map registration page for inputting map information.
Figure 9:
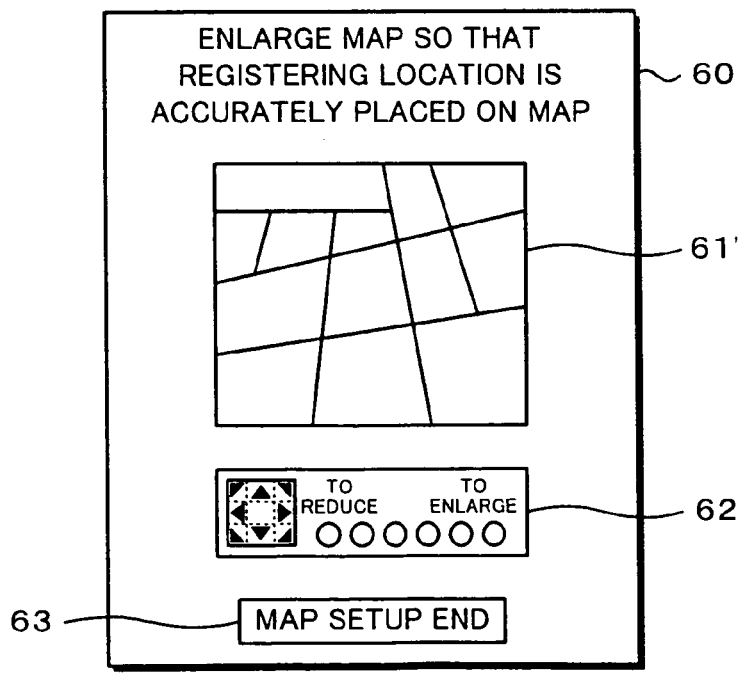
FIG. 9 is a schematic diagram showing an example of a map registration page for inputting map information.

After the input button 55 has been pressed and the business category has been input, a map information input page is displayed. FIGS. 8 and 9 show examples of the map registration page for inputting map information. The map registration page 60 has a map displaying portion 61, a map controlling portion 62, and a map setup end button 63. The map displaying portion 61 displays a map. The map controlling portion 62 controls enlargement/reduction of a map displayed on the map displaying portion 61, and movement of the display range of the map.

The map displaying portion 61 of the map registration page 60 shows a map in a large scale as shown in FIG. 8. The registering user operates controllers of a map controlling portion 62 so that a desired location is accurately displayed on an enlarged map in the map displaying portion 61. As shown in FIG. 9, when an enlarged map is displayed in the map displaying portion 61, the registering user clicks a map setup end button 63.

Figure 10:
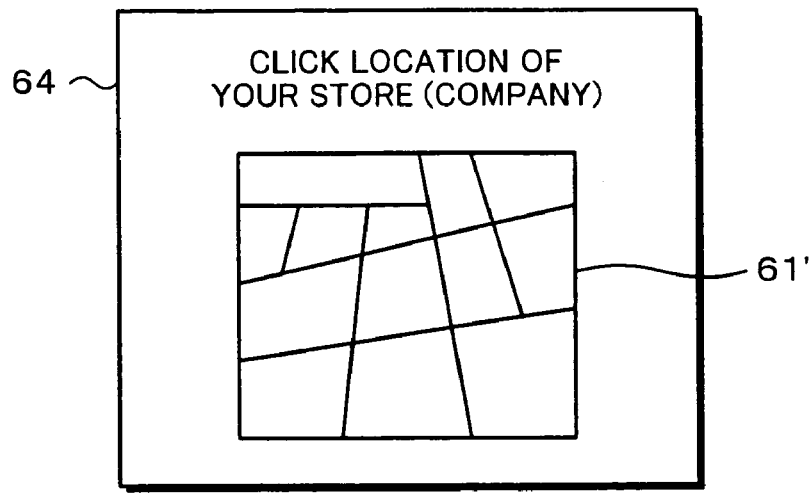
FIG. 10 is a schematic diagram showing an example of a point registration screen for registering a point of a company or a store.

After the map setup end button 63 has been pressed, as shown in FIG. 10, a point registration screen 64 for registering a point is displayed. The point registration screen 64 is different from the map registration page 60. Alternatively, the point registration screen 64 may be in common with the map registration page 60 except for messages displayed thereon. The registering user clicks a desired location with a mouse or the like. The user terminal 4 converts the designated coordinates into latitude and longitude information. The latitude and longitude information is stored to the location search database 11.

Figure 11:
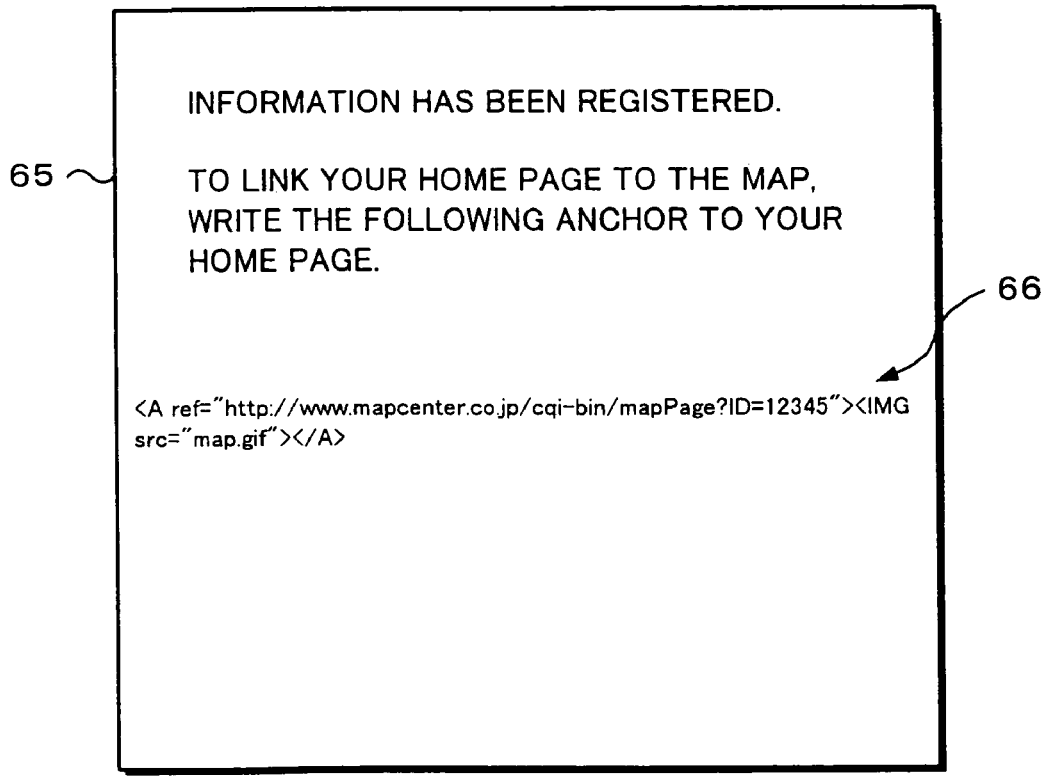
FIG. 11 is a schematic diagram showing an example of a guide screen for guiding a linking method for a registered map.

After information has been registered to the point registration screen 64, a guide screen for guiding a linking method to the registered map is displayed as shown in FIG. 11. On the linking method guide screen 65, an anchor 66 for linking the home page to the registered map is displayed. The anchor 66 is contained in the HTML file for the home page of the store or company. In this example, the anchor 66 is directly copied from the linking method guide screen 65 and pasted to the HTML file. When the HTML file contains the anchor 66, the home page of the HTML file can be linked to the map home page 42 shown in FIG. 5.

In the above-described example, only the location of the store or company guided on the home page as the link source is displayed on the map image 44 of the map home page 42. However, the present invention is not limited to such an example. In other words, information that is expected to be convenient for the user who uses the map home page 42 can be displayed on the map image 44.

Figure 12:
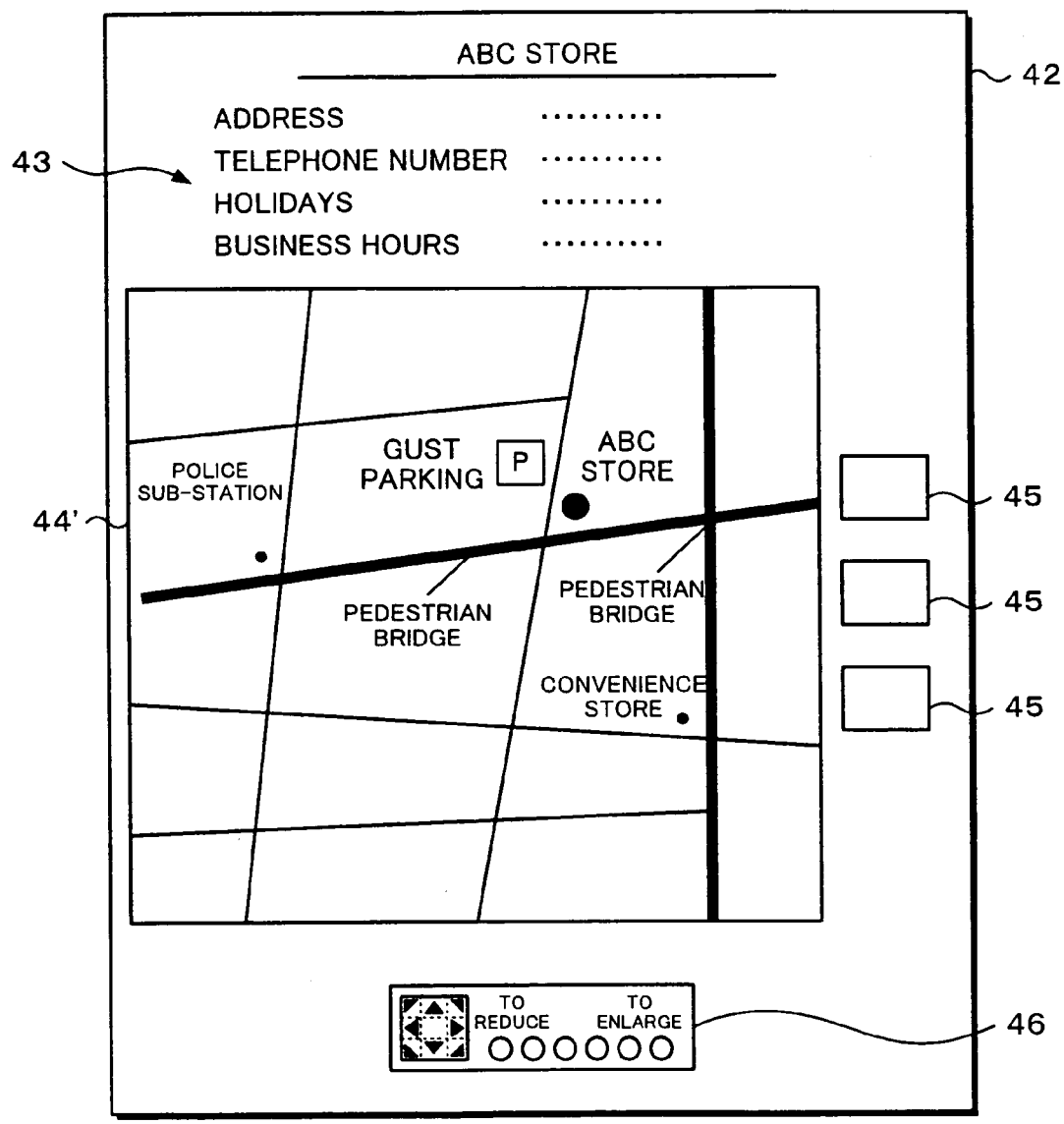
FIG. 12 is a schematic diagram showing an example of a map home page for displaying convenient information on a map of a company or a store.

FIG. 12 shows an example of the map home page 42 on which a map image 44' of information of facilities (police sub-station, pedestrian bridges, neighboring buildings, major loads, and so forth) and a guest parking is displayed. Such information can be registered on the point registration screen 64 shown in FIG. 10. The registered information is stored in for example the location search database 11.

Figure 13:
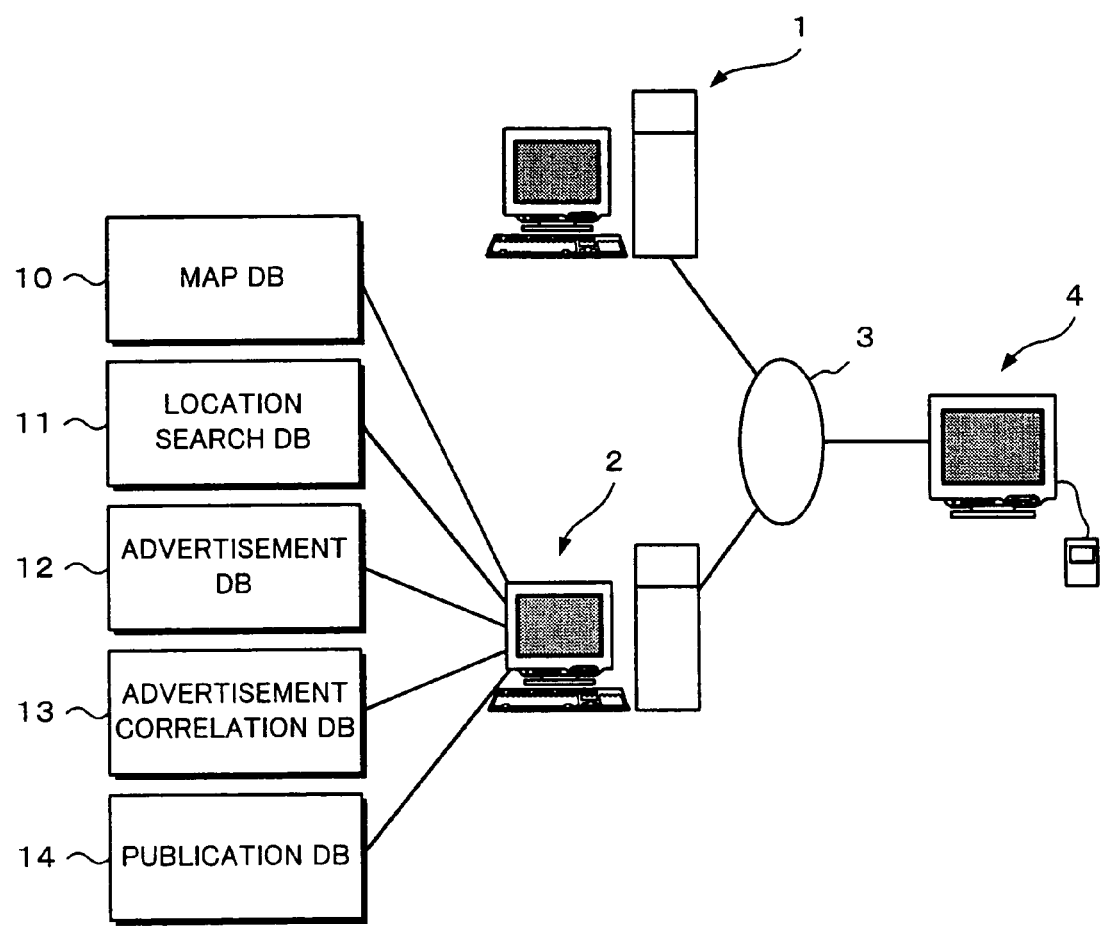
FIG. 13 is a schematic diagram showing an example of the structure of a system of which a publication database is added to a map home page server according to another embodiment of the present invention.

As another example of the embodiment, another database may be added to the map home page server 2. FIG. 13 is a schematic diagram showing an example in which a publication database 14 is added to the map home page server 2. The publication database 14 is correlated with for example publication names. The publication database 14 stores outlines of publications, business categories corresponding to the publications, latitude and longitude information, and so forth. In addition, the publication database 14 may store time conditions of the publications (such as released dates of the publications and sales periods of the publications).

Figure 14:
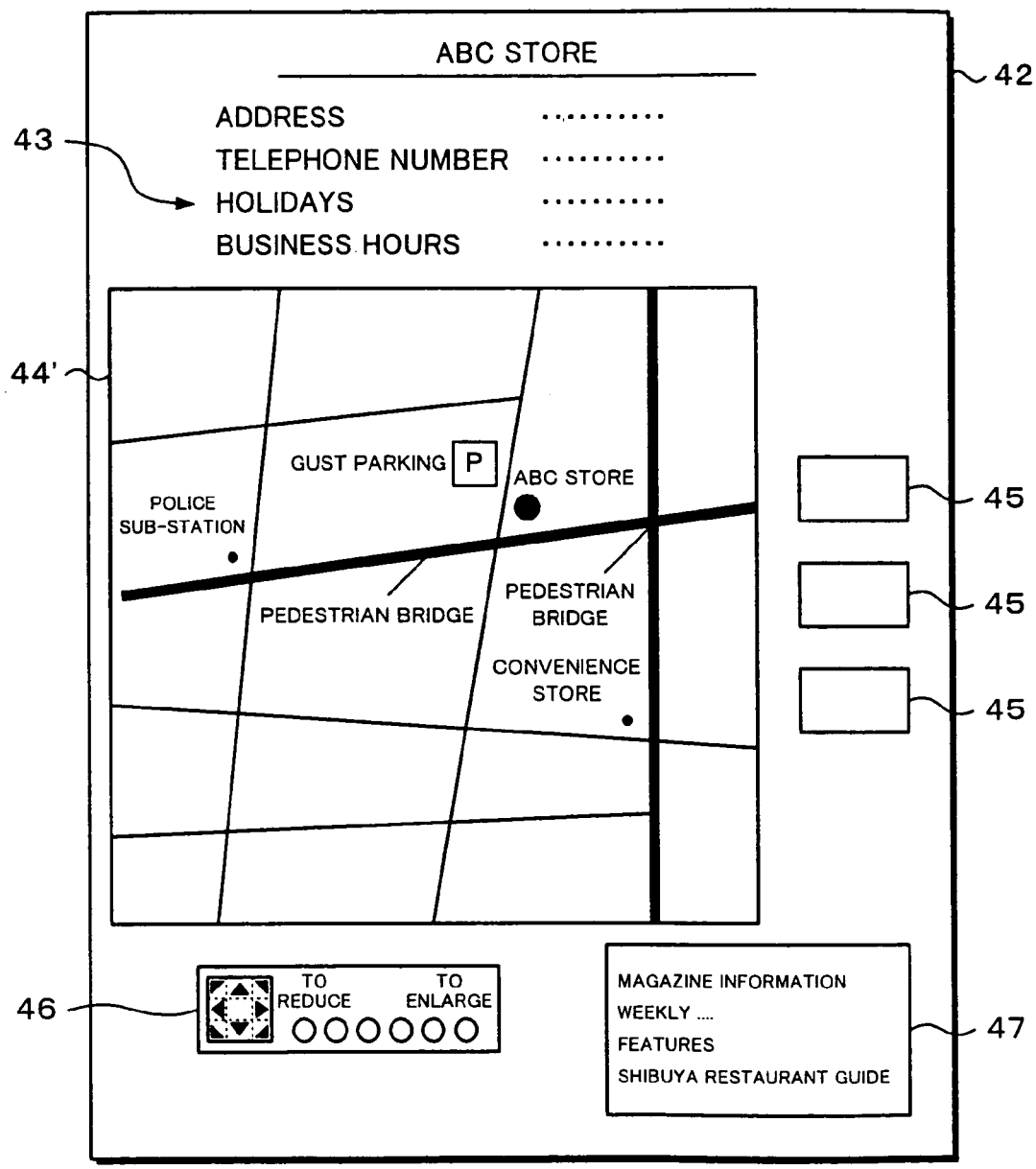
FIG. 14 is a schematic diagram showing an example of a map home page in the case that a publication database is added.

FIG. 14 is an example of the map home page 42 in the case that the publication database 14 is added. In FIG. 14, information stored in the publication database 14 is displayed on the map home page 42 shown in FIG. 12. Publication information 47 is displayed on the map home page 42. In this example, as the publication information 47, a magazine name and an outline thereof are displayed. In addition, the publication information 47 may contain an HTML anchor. Thus, the publication information 47 may be used as a link button to the home page of the publisher of the publication information 47.

Figure 15:
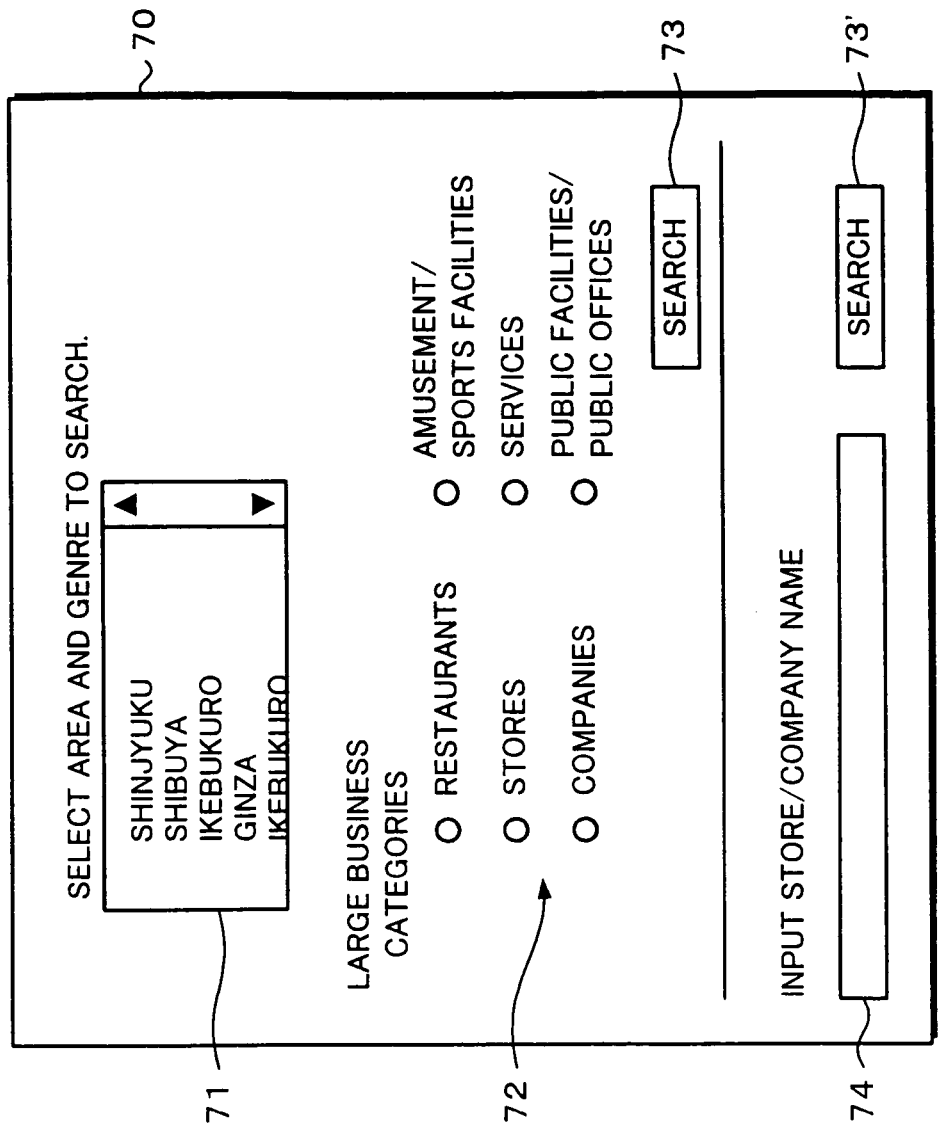
FIG. 15 is a schematic diagram showing an example of a home page for a searching service to a location search database.

The location search database 11 stores much information of stores and companies. Thus, a service that searches the location search database 11 and provides the user with searched information is expected. FIG. 15 shows an example of a home page for such a searching service. The home page for the searching service is present on the map home page server 2. The home page for the searching service is displayed on the user terminal 4.

In this example, the home page for the searching service has a search page 70. The search page 70 has an area selecting portion 71, a business category selecting portion 72, and a name inputting portion 74. The area selecting portion 71 lists searchable area names. The user of the searching service designates a desired area in the area selecting portion 71. In this case, a plurality of areas are preferably designated. The business category selecting portion 72 has large business category names and selecting buttons corresponding thereto. When the searching user clicks a desired selection button, he or she can search the desired business category. The user may select a plurality of business categories at a time. When the user clicks a search button 73, the location search database 11 is searched corresponding to conditions selected in the selecting portions 71 and 72.

Figure 16:
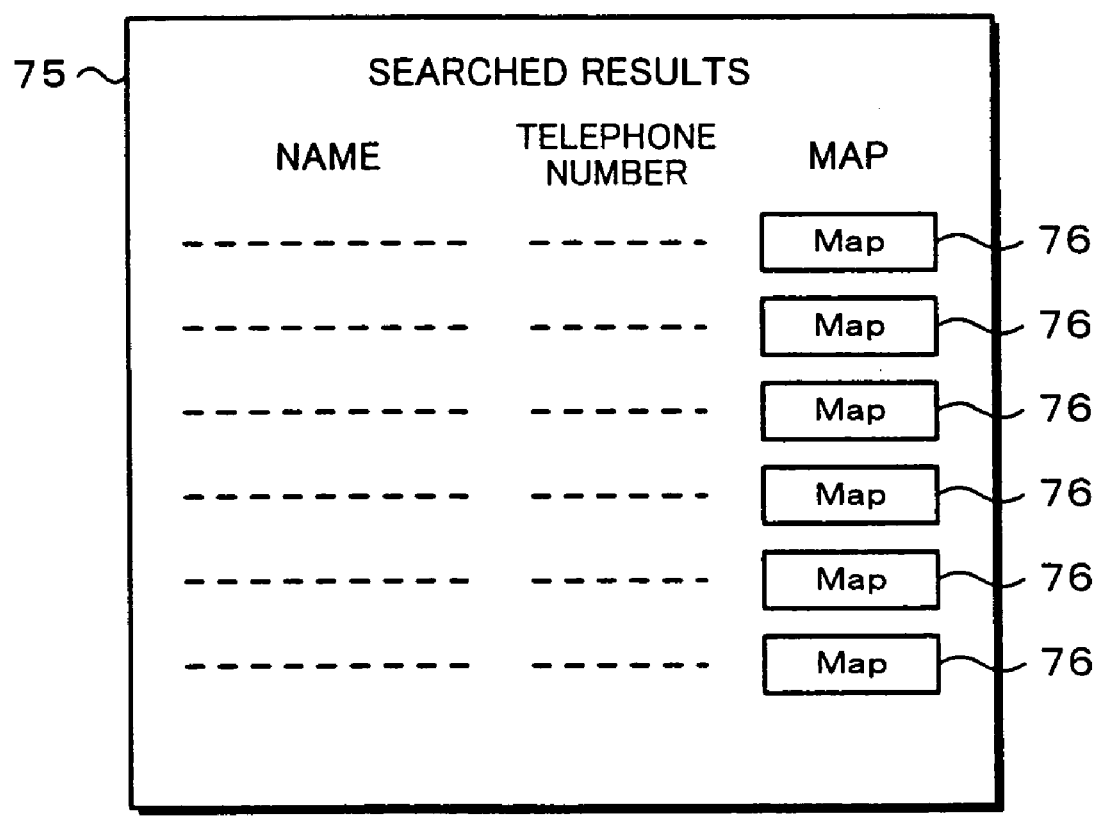
FIG. 16 is a schematic diagram showing an example of searched results of the searching service to the location search database.

FIG. 16 shows an example of searched results. Referring to FIG. 16, a search result page 75 lists searched results. When the user clicks a map button 76 corresponding to the searched results, the home page for the searching service is linked to a relevant map home page 42.

When the user wants to search a particular company or store without information of an area or a business category thereof, he or she directly inputs the name of the company/store to the name inputting portion 74 and clicks the search button 73'. Thus, the location search database 11 is searched with the company/store name and the search result page 75 is displayed.

On the other hand, the map displaying service WWW server is linked from many home pages. Thus, many users access the map home page server 2. Consequently, since the load applied to the map home page server 2 becomes high, it takes a long time for a response against an access from the user terminal 4 to the map home page server 2. Thus, the users of the searching service may be frustrated.

To solve such a problem, it is expected to restrict operations of the user against the map home page. For example, the user is restricted to maps of areas close to a designated area. In addition, the number of times of an enlarging/reducing operation and a moving operation of a map may be restricted. When the number of users who are accessing the map displaying service WWW server is small, such restrictions may not be applied.

Figure 17A:
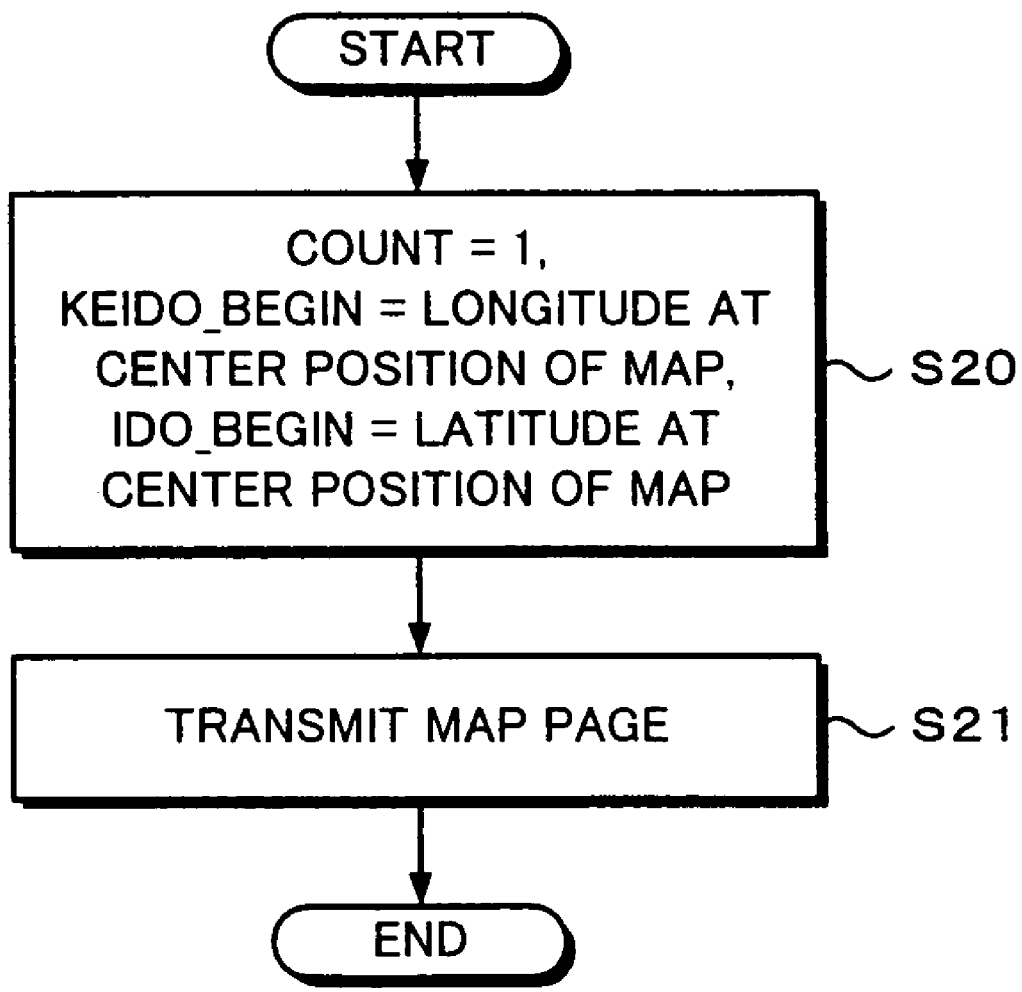

FIGS. 17A and 17B are flow charts showing such a process. FIG. 17A shows a linking operation with the link button 41 on the home page 40 for guiding a company or a store. When the link button 41 is clicked on the home page 40, a link request is issued from the home page 40 to the map home page server 2. At this point, a variable COUNT is set to "1". Latitude and longitude information at the center position of the map is searched from the location search database 11. With the latitude and longitude information, a variable KEIDO_BEGIN is set to the longitude value at the center position of the map. Likewise, a variable IDO_BEGIN is set to the latitude value at the center position of the map. After required variables have been set at step S20, the flow advances to step S21. At step S21, the map home page server 2 transmits the map home page 42 to the user terminal 4.

FIG. 17B shows a restricting process against the enlarging/reducing operation and the center position moving operation for the map image 44 by the controller 46 on the user terminal 4. This restricting process is performed by the map home page server 2. When the user terminal 4 accesses the map home page server 2, the map home page server 2 determines whether or not the number of users who are accessing the map home page server 2 does not reach a predetermined upper limit value (at step S30). When the determined result is Yes, the flow advances to step S37. At step S37, the map home page server 2 transmits the map home page 42 to the user terminal 4.

When the determined result at step S30 is No, the flow advances to step S31. At step S31, it is determined whether or not the value of the variable COUNT does not reach a predetermined upper limit value. As will be described later, the variable COUNT represents the number of times of the operation of the controller 46 on the user terminal 4. When the upper limit value is assigned to the variable COUNT, the number of times of the operation of the controller 46 can be restricted.

When the determined result at step S31 is No, the flow advances to step S38. At step S38, the controller 46 transmits a message to the user terminal 4 so that the user knows that a map cannot be displayed on the map home page 42.

On the other hand, when the determined result at step S31 is Yes, the flow advances to step S32. At step S32, the variable COUNT is incremented by "1". In addition, the operation of the controller 46 on the user terminal 4 is accepted. In other words, corresponding to the operation of the controller 46, the current map image is enlarged/reduced or the center position of the current map image is moved. The resultant map image data is transmitted to the user terminal 4 and displayed on the map home page 42. The center latitude and center longitude of the new map image data are placed in the variable IDO and the variable KEIDO, respectively.

At steps S33 to S36, it is determined whether or not the center latitude and center longitude of the new map do not reach predetermined ranges of those of the original map. The moving range of the center position of the new map against the original map is pre-designated in latitude and longitude. At steps S33 to S36, the difference between the variable KEIDO_BEGIN and the variable KEIDO is compared with the longitude range. In addition, the difference between the variable IDO_BEGIN and the variable IDO is compared with the latitude range. Corresponding to the compared results, it is determined whether or not the moving range of the center position of the new map does not reach the latitude range and the longitude range.

When at least one of the determined results at steps S33 to S36 is No, since the moving range reaches the latitude range and the longitude range, the flow advances to step S38. At step S38, a message is displayed on the user terminal 4 so that the user knows that a map cannot be displayed.

On the other hand, when all the determined results at step S33 to S36 are Yes, the flow advances to step S37. At step S37, the new map image data is transmitted to the user terminal 4.

In the above-described example, the home page 40 for guiding a company or a store is present in the home page server 1. However, the present invention is not limited to such an example. In other words, the home page 40 may be present in the map home page server 2.

In the above-described example, the databases 10, 11, 12, 13 and 14 are directly connected to the map home page server 2. However, the present invention is not limited to such an example. In other words, the databases 10, 11, 12, 13, and 14 may be distributively disposed on Internet 3.

In addition, anchors may be placed on the advertisement images 45 on the map home page 42 so as to link them to other home pages. For example, the advertisement images 45 may be linked to respective home pages of companies and stores that are advertisers. Alternatively, the map home page 42 may be displayed corresponding to the advertisement images 45.

As described above, according to the present invention, on a home page for guiding a company, a store, or the like to the map home page, a map of a neighboring area thereof is displayed on the map home page. In addition, an advertisement corresponding to a business category of the company or store is displayed at a peripheral portion of the map. Thus, it is expected that the user who uses the home page of the company or store is interested in the advertisement. Consequently, a high advertisement effect can be obtained.

In addition, since an advertisement is displayed depending on latitude and longitude of the map and time conditions thereof, a higher advertisement effect can be expected.

In addition, according to the present invention, an advertisement can be properly selected depending on latitude and longitude information. Thus, an advertisement can be displayed for users who need map information of local areas as well as map information of large amusement areas.

In addition, it is assumed that the number of advertisements required by small companies, stores, and people is small. Thus, when an advertisement is charged for each placement with the system according to the present invention, a small company, a small store, and a person can place an advertisement at low cost.

According to another embodiment of the present invention, an advertisement for a publication in an area of a map that the user wants to see is automatically searched and displayed at a peripheral portion of the map on the map home page. For example, when a map of an amusement area is displayed on the map home page, the title of a magazine that features the area is displayed. When a resort area is displayed on the map home page, the title of a magazine that features the amusement area and the title of a newly released book that deals with the area are displayed at a peripheral portion of the map. Thus, the user can easily find publications that deal with a desired area. Consequently, since the user has a motivation for purchasing such publications, a high advertisement effect can be obtained.

In addition, according to the present invention, the creator of a home page can place a map on his/her home page by inputting a mark and a character string on a map image provided by the map home page server without need to create a detailed accurate map.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. An information displaying system including a server apparatus and an information displaying apparatus capable of accessing said server apparatus, for displaying information corresponding to a geographical location on said information displaying apparatus, comprising:

information displaying means;

display commanding means pre-assigned with a unique identification code for accepting a user's selecting operation and outputting a commanding signal to have said information displaying means display the information when the display commanding means is selected by the user's selecting operation;

first data storing means for storing map drawing element data corresponding to a geographic location;

second data storing means for storing said geographic location and for storing first attribute information so that said geographic location and said first attribute information correlate with said identification code, wherein said first attribute information is business related information corresponding to said identification code;

third data storing means for storing advertisement data and second attribute information corresponding to said advertisement data;

map drawing command means for accepting said commanding signal sent from said display commanding means, for searching a geographic location corresponding to said identification code pre-assigned to said information displaying means from said second data storing means, searching said map drawing element data corresponding to said searched geographical location from said first data storing means, and controlling said information displaying means to draw map information using said searched map drawing element data; and advertisement display commanding means for accepting said commanding signal sent from said display commanding means, searching an advertisement data from said third data storing means, and controlling the information displaying means to display advertisement information using said searched advertisement data, wherein said advertisement display commanding means comprises:

a correspondence determination section for determining a correspondence relationship between said first attribute information and said second attribute information; and an advertisement searching section for determining said second attribute information corresponding to said commanding signal sent from said display commanding means using said determined correspondence relationship, and searching said advertisement data using said determined second attribute information, and wherein said information displaying means displays both said map information and said advertisement information at said same display screen, said map information and said advertisement information being generated by said map drawing commanding means and said advertisement display commanding means, respectively.

* * * * *

UNITED STATES PATENT AND TRADEMARK OFFICE
CERTIFICATE OF CORRECTION

| | |
|---|---|
| PATENT NO. | : 7,151,548 B1 |
| APPLICATION NO. | : 09/236886 |
| DATED | : December 19, 2006 |
| INVENTOR(S) | : Chiharu Hirono |

It is certified that error appears in the above-identified patent and that said Letters Patent is hereby corrected as shown below:

On the title page item (57), line 19, Abstract, the last word "means" should read --unit--;

In column 5, line 54, insert a comma after "draw";

In column 5, line 55, insert a comma after "example";

In column 5, line 56, insert a comma after "display";

In column 5, line 57, insert a comma after "example".

Signed and Sealed this

First Day of July, 2008

JON W. DUDAS
*Director of the United States Patent and Trademark Office*